United States Patent
Schneider et al.

(10) Patent No.: US 9,307,863 B1
(45) Date of Patent: Apr. 12, 2016

(54) PIE PAN WITH FOLD-DOWN WALL SECTION

(71) Applicants: Michael S. Schneider, Marina del Rey, CA (US); Ken Bagdasarian, Whittier, CA (US)

(72) Inventors: Michael S. Schneider, Marina del Rey, CA (US); Ken Bagdasarian, Whittier, CA (US)

( * ) Notice: Subject to any disclaimer, the term of this patent is extended or adjusted under 35 U.S.C. 154(b) by 0 days.

(21) Appl. No.: 14/526,465

(22) Filed: Oct. 28, 2014

(51) Int. Cl.
*A47J 37/01* (2006.01)
*B65D 85/36* (2006.01)

(52) U.S. Cl.
CPC *A47J 37/01* (2013.01); *B65D 85/36* (2013.01)

(58) Field of Classification Search
CPC .............. A47J 37/01; A21B 3/18; B65D 7/36; B65D 7/12; B65D 7/32; B65D 7/30; B65D 7/24; B65D 15/24; B65D 85/36
USPC .............. 220/573.1, 574, 666, 689, 690, 691, 220/684, 683, 682, 677, 641, 642, 654, 643, 220/640, 639; D7/354; 426/389; 99/449; 206/551
See application file for complete search history.

(56) References Cited

U.S. PATENT DOCUMENTS

| | | | | |
|---|---|---|---|---|
| 3,327,921 A | * | 6/1967 | Baughan | B65D 5/2033 229/110 |
| 3,580,484 A | * | 5/1971 | Schneider | A21B 3/131 206/551 |
| D653,072 S | | 1/2012 | Schneider | |
| D657,187 S | | 4/2012 | Schneider | |

* cited by examiner

*Primary Examiner* — Robert J Hicks
(74) *Attorney, Agent, or Firm* — Jonathan Jaech; Snell & Wilmer L.L.P.

(57) ABSTRACT

A pie pan has a sidewall configured with a cut-out wall section that is held up and in place during packaging and/or baking of a pie, which can be folded down prior to serving the pie to improve access for removal of a first slice of pie. A method of making the pan from a foil sheet includes cutting out the wall section, and forming a releasable connection between the wall section and the remainder of the pan. Forming the releasable connection may include reducing a diameter of the remainder of the pan, nesting the wall section against an outside of the remainder of the pan, and curling a rim of the remainder of the pan over an overlapping portion of a rim of the wall section. This curling operation may create a rim of the wall section slideably engaged inside a rim of the remainder of the pan.

16 Claims, 8 Drawing Sheets

FIG. 9A
Section B-B

PIE PAN WITH FOLD-DOWN WALL SECTION

FIELD

The present disclosure relates to pie pans, methods for the manufacture of such pans from foil, and methods for using pie pans to serve pie.

BACKGROUND

Baking dishes for pies are as old as pies themselves, dating back at least to Roman times. More recently, disposable, lightweight pie pans made from thin aluminum foil have been developed for baking and/or serving pies, principally to support the convenience food market for pre-made pies. According to the Aluminum Foil Container Manufacturers Association, the first aluminum foil pie pan was developed by George Buff, Jr. of New Jersey and entered the market in 1948.

Buff's foil pan was perhaps the first commercially successful food container made from aluminum foil. Its success led to a great proliferation of many other types of foil containers for food, in a great variety of shapes and designs. Meanwhile, the basic design of the foil pie pan itself has little changed since its introduction. Circular in shape, most pie pans are eight to twelve inches in diameter and one to two inches deep. A crinkled, outwardly sloping side wall surrounds the circular bottom. An annular ring serving as crust support ledge runs around the upper edge of the side wall. A distal portion of the ring may be curled into a generally cylindrical shape forming a circular rim around the pan to protect the consumer from any exposed sharp edges of the foil.

This simple configuration has stood the test of time, but lacks certain conveniences that may be of value to consumers. For example, it can be difficult to remove the first slice of pie from the pan without damaging the appearance of the slice, rendering it unsuitable for presentation to guests or sale to customers. It would be desirable to resolve this problem while preserving the advantages of low cost and simplicity afforded by conventional foil pie pans. Solutions for these and other limitations of prior art pie pans, methods for manufacturing pie pans, and methods for using pie pans, are presented in the specification that follows.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a pie pan is configured to have a sidewall with a cut-out wall section that is held up and in place during packaging and/or baking of a pie, which can be folded down prior to serving the pie to improve access for removal of a first slice of pie. The pie pan includes a releasable connection holding the wall section up and against sidewall of the pie pan until released by the end user at the time of serving.

In an embodiment of a pie pan having these novel features, a foil pie pan includes a sheet of ductile material formed into a sidewall in the form of a truncated cone extending between a closed bottom and an open top, a ring oriented generally parallel to the bottom extending outwardly from and around an upper edge of the sidewall, and a curled rim formed around an outer periphery of the ring. The pie pan further includes a pair of cuts through the sidewall, ring, and rim, defining a wall section separated from a remainder of the pan and capable of flexure towards the bottom. The pie pan further includes overlapping portions of the curled rim between the wall section and the remainder of the pan, configured for engagement with one another adjacent to the pair of cuts. Engagement of the rims may provide a releasable connection between the cut-out wall section and the remainder of the pan. Pulling the rim of the wall section outward and generally along a radius of the pan may cause the rims to disengage, releasing the connection of the wall section to the pan, and allowing the wall section to be folded down. Folding down the wall section creates an opening in the sidewall of the pan, facilitating removal of a slice of pie. For example, flexure of the wall section may expose a sector of the pie, enabling insertion of a pie removal utensil between a pie retained in the pan and the bottom, without touching the sidewall.

In related aspects of the pie pan, the bottom of the pan may be circular in shape and the sidewalls may be circularly symmetric around a center of the bottom. The pair of cuts may be aligned along radii overlapping from the center of the bottom. The sheet may be, or may include, aluminum foil in the range of 0.003 to 0.004 inches thick. In another aspect, the pie pan may include a pull tab attached to an exterior side of the wall section. The pull tab may be crimped to the curled rim, to facilitate disengagement of the rims by pulling the rim outward.

In other, related aspects, the overlapping portions may include generally concentric cylindrical portions of the curled rim. In addition, overlapping portions of the curled rim formed from the wall section may be reduced in diameter to fit inside corresponding overlapping portions of the curled rim formed from the reminder of the sidewall. This reduction may be provided as a result of nesting the rims together with the rim of the wall section exterior to the rim of the sidewall, and then curling the rims together starting from an interior of the pan, using a die configured to form a curled rim having a generally circular cross section of constant diameter. This forming process may provide a releasable connection, wherein the wall section is removeably engaged with the remainder of the pan by the overlapping portions.

In other aspects of the disclosure, a method of making the pan from a foil sheet may include cutting out the wall section, and forming a releasable connection between the wall section and the remainder of the pan. For example, a method may include, first of all, forming a pan in a sheet of ductile material, the pan including a sidewall in the form of a truncated cone extending between a closed bottom and an open top. The method may further include making a pair of cuts through the sidewall and the ring just outside the wider portion, defining a wall section separated from a remainder of the pan. The pair of cuts may be aligned along radii extending from a center of the bottom. These operations may be combined and performed using a single die operation, for example, a forming operation using a progressive die.

The method may include trimming the sheet around the sidewall, thereby forming a ring (sometimes called a trim strip or crust support ledge) around a top of the sidewall and generally parallel to the bottom. The method may further include reducing a diameter of the remainder of the pan excluding the wall section. This may enable the wall section to be nested outside of the remainder of the side wall. The method may further include forming a curled rim from the ring all along the wall section and remainder of the pan, while the wall section is so nested. Forming the curled rim may thereby include forming overlapping portions of the curled rim from at least one of the wall section or the remainder of the pan, and engaging the overlapping portions with one another by curling a rim of the sidewall inside a rim of the wall section. For example, forming the curled rim further may include removeably engaging the wall section with the remainder of the pan by forming a free sliding relation between the overlapping portions. Any two of more of these operations may be combined and performed using a single die operation, for example, a forming operation using a progressive die.

In another aspect, the method may further include attaching a pull tab to an exterior side of the wall section. The pull tab may be attached by crimping to the curled rim. The pull tab may facilitate releasing the cut-out wall section from the remainder of the pan. Pulling the tab outward may cause flexure of the curled rim of the wall section, drawing it out of the curled rim of the remainder of the pan.

In another aspect, a method for manipulating a pie pan to facilitate removal of a slice of pie contained therein may include placing a pie pan containing a pie on a horizontal surface, wherein the pie pan includes a cut-out wall section held by a connection to a remainder of the pie pan. The method may further include releasing the connection. The method may include creating an opening in a sidewall of the pie pan by folding the cut-out wall section towards the horizontal surface, after releasing the connection, and removing a slice of the pie at least partially through the opening. Releasing the connection may include disengaging a curled rim of the wall section from engagement inside a curled rim of the remainder of the pie pan, for example, by pulling a pull tab outward.

The foregoing summary provides an overview and selected details of the pie pan, a method for manufacturing it, and a method for using it. Further aspects and details of the pie pan and methods are provided in the detailed description that follows. The drawings accompanying the written disclosure will first be described briefly.

BRIEF DESCRIPTION OF THE DRAWINGS

The drawings described herein are for illustrative purposes and are not intended to limit the scope of the present disclosure. Like element numerals may be used to indicate like elements appearing in one or more of the figures.

DETAILED DESCRIPTION

The present disclosure describes a pie pan with a fold-down wall section, a method for manufacturing such a pie pan from foil, and a method for using a pie pan with a fold-down wall section to serve pie. The pie pan has a sidewall configured with a cut-out wall section that is held up and in place during packaging and/or baking of a pie, which can be folded down prior to serving the pie to improve access for removal of a first slice of pie. The pie pan includes a releasable connection holding the wall section up and against sidewall of the pie pan until released by the end user at the time of serving.

Referring generally to FIGS. 1-4, a pie pan 100 with a fold-down wall section 102 may include a sheet of ductile material 104 formed into a pan including a sidewall 106 in the form of a truncated cone extending between a closed bottom 108 and an open top for receiving a pie. The pan may have roughly the dimensions of a traditional pie pan, for example, a diameter in the range of eight to twelve inches and a depth in the range of one to two inches. In other embodiments, a small pie pan may be in the range of five two eight inches in diameter, and an extra-large size pan may be in the range of twelve to fourteen inches in diameter. However, the novel features of this disclosure are not limited to any particular diameter or depth of pie pan, and may be applied to pans with dimensions outside of the mentioned ranges. The pie pan 100 may further include a horizontal ring 110 oriented generally parallel to the bottom 108, for supporting a pie crust. The ring 110 may extend horizontally outwardly from and around an upper edge 112 of the sidewall that defines the top of the pie pan. The pan 100 may further include a curled rim 114 formed around an outer periphery of the ring 110.

The pie pan 100 may further include a pair of cuts 116 through the sidewall, ring, and rim (FIG. 1), defining the wall section 102 separated by the cuts from a remainder of the pan. The wall section may be capable of flexure towards the bottom 108 generally along a bottom edge 118, where the wall section is connected to a remainder 126 of the pan. The pie pan may further include overlapping portions 120 of the curled rim 114 between the wall section 102 and the remainder of the pan 106, configured for engagement with one another adjacent to the pair of cuts 116. Engagement of the rims may provide a releasable connection between the cut-out wall section 102 and the remainder of the pan 100. Other releasable connections may also be suitable, for example, a connection made using adhesive tape, adhesive dots, or hookand-loop material, for pies that do not have to be baked. An advantage of using overlapping curled rims for the connection, as illustrated and described herein, may include that the connection will withstand the heat of baking, can be formed in the same operation as the rest of the pan, and does not require additional material or components.

Figure 3:
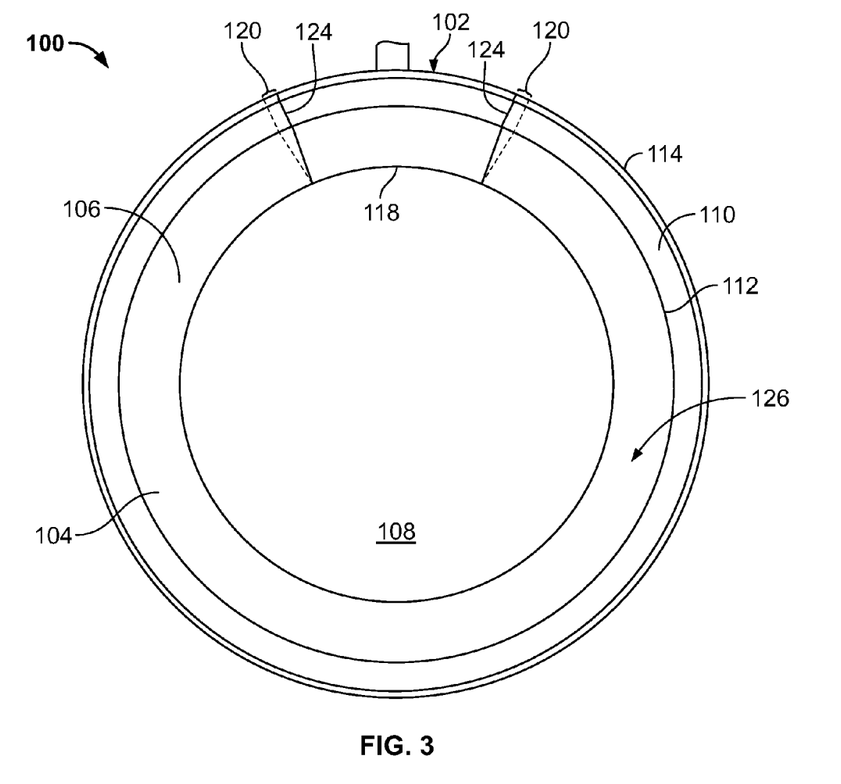
FIG. 3 is a plan view of the pan shown in FIG. 1, wherein the fold-down wall section is folded up and engaged at its rim with the remainder of the pie pan.
Figure 4:
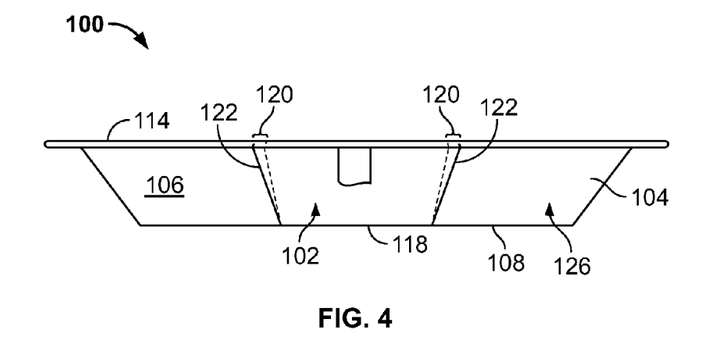
FIG. 4 is a side view of the pan shown in FIG. 1, looking towards the fold-down wall section in its up and engaged position.

The bottom of the pan 108 may be circular in shape and the sidewalls 106 may be circularly symmetric around a center of the bottom. The pair of cuts 116 may be aligned along radii overlapping from the center of the bottom, and define opposing edges 122 of the wall section 102 and edges 124 of the remainder 126 of the sidewall 106. As depicted in FIGS. 3-4, these edges 122 of the wall section 102 are not parallel to the edges 124 of the remainder 126 of the sidewall 106. This divergence between the edges 122 and 124 may be formed using a manufacturing process as described herein, and may be useful for enabling the releasable connection between the wall section 102 and remainder 126 of the pan 100 by providing the overlap 120 prior to curling the rim 114. The curled, overlapping rim portion 120 of the wall section may be reduced in diameter, as shown in the enlarged detail of FIG. 1. This reduction in diameter may be provided as a result of being formed inside the rim of the remainder of the pan, such as by using a die that uniformly constrains the cross-sectional size of the rim.

The ductile sheet may be, or may include, aluminum foil in the range of 0.003 to 0.020 inches thick, for example, 40 gage aluminum foil. However, the pie pan is not limited to aluminum or other metal foils. For example, a similar molded plastic pie pan could be made with a fold-down wall section using vacuum forming or injection molding. Such a pan might not be usable for baking unless made with a high-temperature polymer, but could be used to hold and serve an unbaked "refrigerator" pie, such as, for example, a cream or gelatin pie with a Graham cracker crust. In other embodiments, a ceramic pie pan for making and serving pie may be provided with a removable ceramic wall section similar to the illustrated folding wall section. A removable wall section of ceramic or similar materials might be held in place by interlocking tabs or the like during baking and storing, and lifted out of place at the time of serving.

The pie pan 100 may include a pull tab 128 made of aluminum foil or other suitable material attached to an exterior side of the wall section. The pull tab 128 may be crimped to the curled rim 114, to facilitate disengagement of the rim of the wall section 102 from the rim of the remainder 126, by pulling the wall section rim outward. The pull tab may be of any suitable dimension and geometry configured to provide adequate strength, ease of use, and economy. For example, a generally rectangular foil tab in the range of one-quarter (0.25) to three-quarters (0.75) inches wide and one-half (0.5) to one-and-a-half (1.5) inches long may be suitable.

Figure 5:
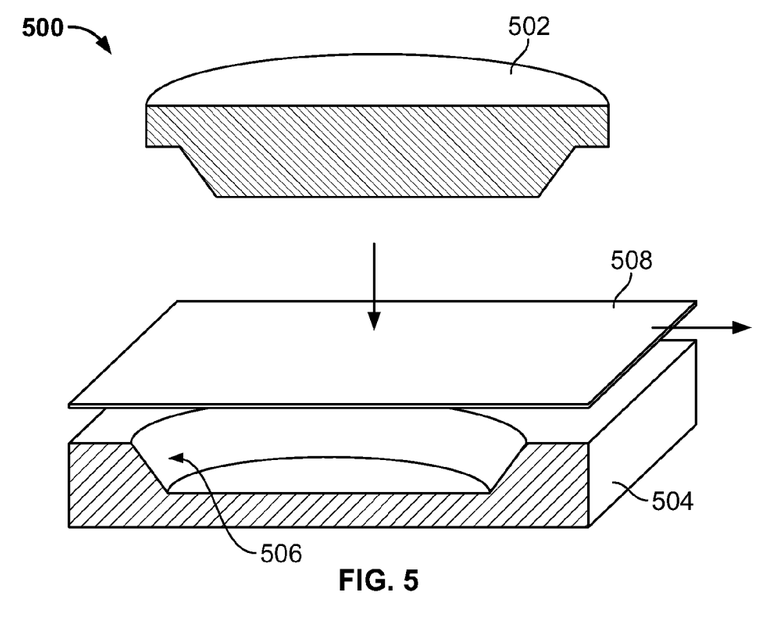
FIG. 5 is a schematic view of a first, multi-stage forming operation in a process of making a foil pie pan with fold-down wall section.
Figure 6:
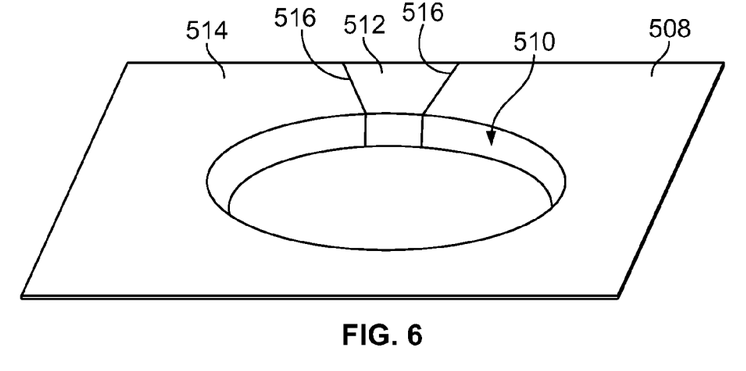
FIG. 6 is a schematic view of a foil blank after the first forming operation, illustrating effects thereof.

Referring to FIGS. 5-10, a method 1000 of making the pan 100 from a foil sheet may include cutting out the wall section, and forming a releasable connection between the wall section and the remainder of the pan. For example, with reference to FIG. 10, a method 1000 may include, first of all, forming 1010 in a sheet of ductile material a sidewall (510, FIG. 6) in the form of a truncated cone extending between a closed bottom and an open top. The method 1000 may further include making a pair of cuts through the sidewall and the ring just outside the wider portion, defining a wall section separated from a remainder of what will become the pie pan. The pair of cuts may be aligned along radii extending from a center of the bottom. These operations 1010 and 1020 may be combined and performed using a single die operation, for example, a forming operation using progressive die. As shown in FIG. 5, an upper portion 502 of a die 500 may be pressed into a recess 506 of a lower die 504, thereby forming an intervening sheet of ductile material 508 (e.g., aluminum foil) into the described shape, as shown in FIG. 6. The die 500 may include blades or other cutting edges (not shown), which make the pair of cuts 516 illustrated, separating the wall section 512 from the remainder 514. The die 500 may be a progressive die for aluminum forming operated using methods as known in the art of die forming and cutting, modified as described above.

Figure 1:
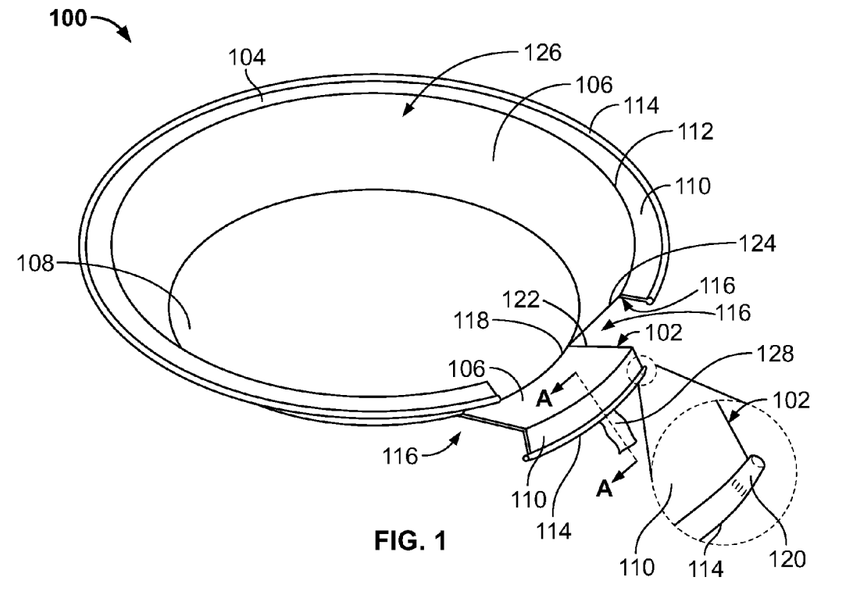
FIG. 1 is a perspective view showing an example of a foil pie pan with a fold-down wall section, including a detail view inset showing an overlapping portion of the wall section's rim when disengaged from the rim of a remainder of the pan.
Figure 2:
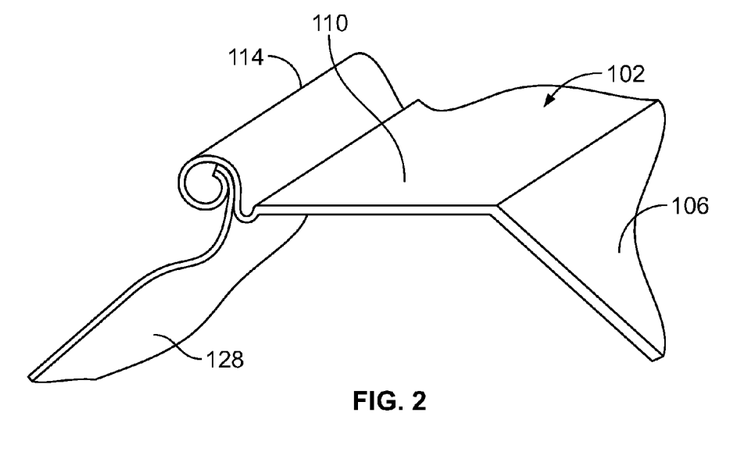
FIG. 2 is a detail section view of the rim of the pan shown in FIG. 1, at the location of a pull tab attached to the fold-down wall section.
Figure 7:
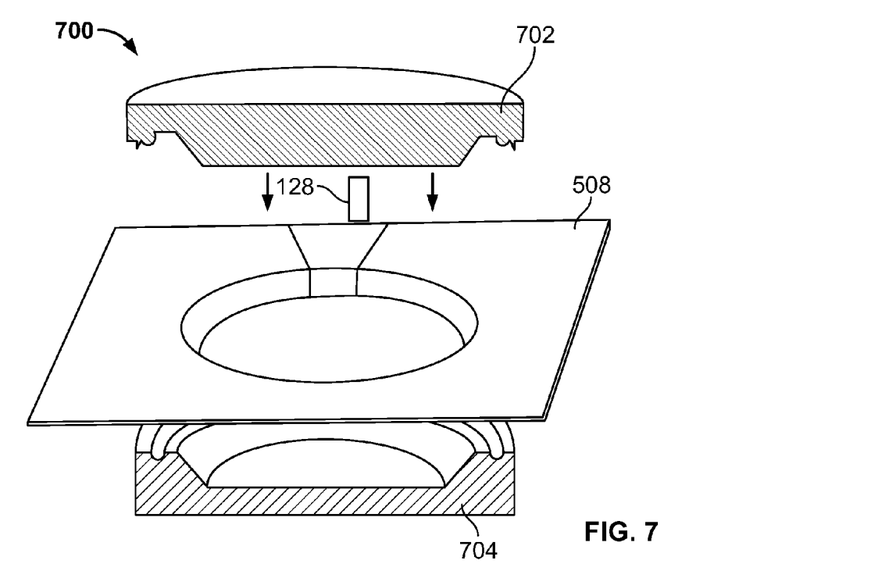
FIG. 7 is a schematic view of a second, multi-stage forming operation in a process of making a foil pie pan with fold-down wall section.
Figure 8:
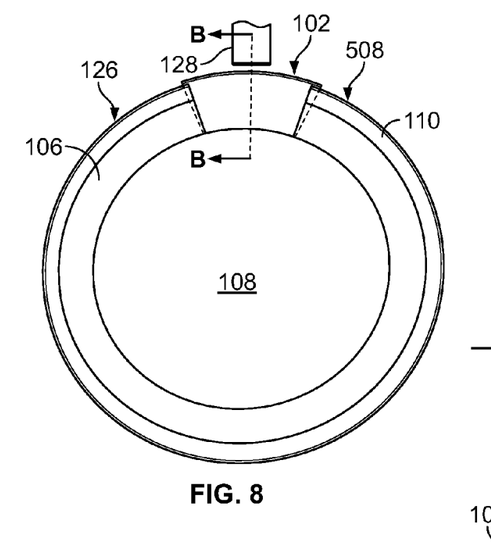
FIG. 8 is a schematic view of an unfinished pan at an intermediate point in the second forming operation, illustrating formation of interlocking curled rims for holding the fold-down wall section in place.

Referring again to FIG. 10, the method 1000 may include trimming 1030 the sheet around the sidewall, thereby forming a ring 110 (sometimes called a trim strip or crust support ledge) around a top of the sidewall and generally parallel to the bottom, as shown in FIGS. 1 and 8. This may be done using a second progressive die 700 including upper and lower portions 702, 704 cutting the sheet 508, as shown in FIG. 7. The second die 700 may be or may include a progressive die operated using methods as known in the art of die forming and cutting, modified as described herein.

Figure 9A:
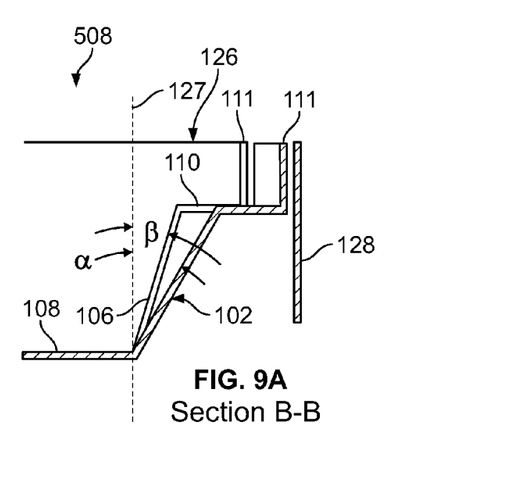
FIG. 9A is a detail section view showing the rim at the fold-down wall section just before a rim curling operation for joining the rims to hold the fold-down wall section up.
Figure 10:
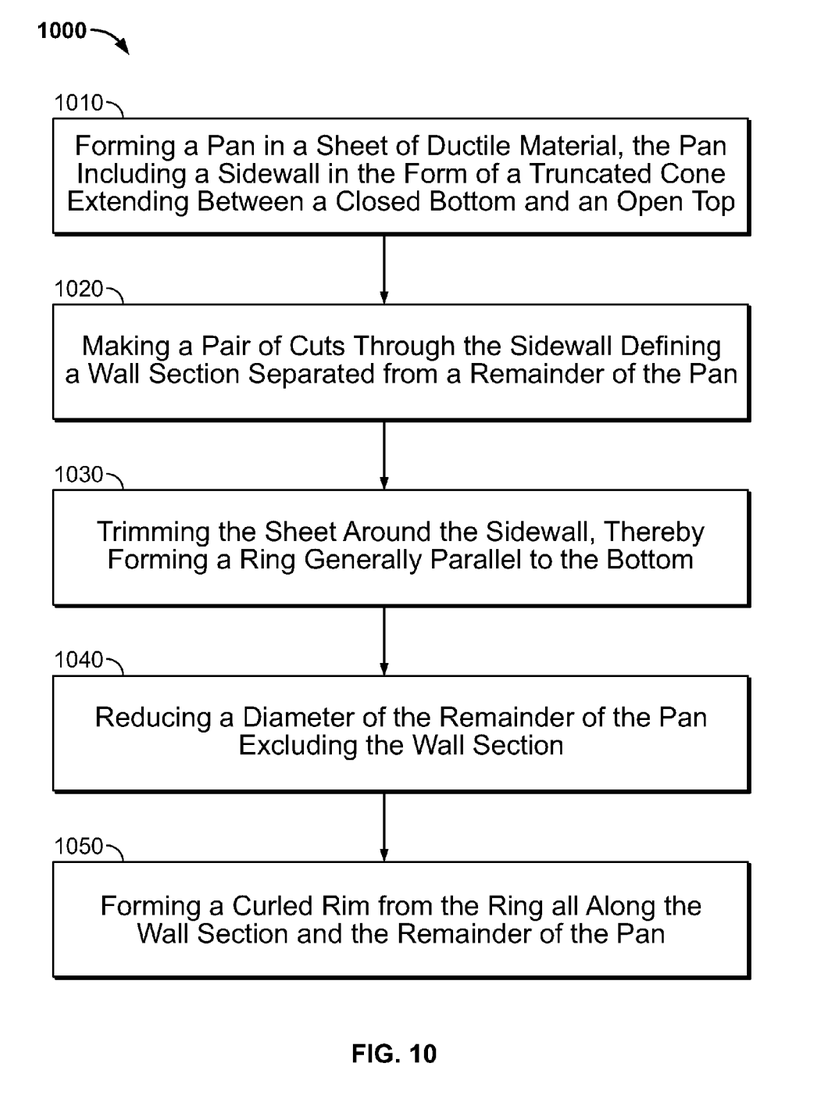
FIG. 10 is a flow chart illustrating operations of a method for forming a foil pie pan with fold-down wall section.

The method 1000 may further include reducing 1040 a diameter of the remainder of the pan excluding the wall section, by re-forming the side wall to a slightly more vertical angle without altering the same angle in the wall section. This may enable the wall section to be nested outside of the remainder of the side wall, as shown in FIG. 9A. For example, the diameter of the remainder 126 of the pan at the top of the side wall may be reduced by an amount in the range of 0.05% to 2%, for example, 0.2% (i.e., for a ten-inch diameter pan, about 0.020 inches). The diameter reduction may be provided by reducing the angle 'β' of the sidewall 106 to a vertical plane 127 that is perpendicular to the bottom 108 of the pan, relative to the original angle 'α' made in the first forming operation. The original, shallower angle 'α' may be retained in the sidewall of the wall section 102. The depicted amount of angle reduction is exaggerated in FIG. 9A for illustrative effect. It is only necessary to provide enough angle reduction to allow the wall section 102 to fit just outside of the remainder 126, which will vary depending on the height of the sidewall, the original angle 'α' and thickness of foil material used. For example, for a 40 gauge foil, original sidewall angle of 45° and sidewall that is about 1.5 inches measured from the bottom of the pan to the trim strip, the amount of angle reduction needed may be less than 5 degrees, for example, 2.5 degrees. The diameter reduction operation or a related operation may also fold up a portion of the ring 110 into a vertical orientation perpendicular to the bottom, in preparation for curling and crimping. FIG. 8 illustrates in plan view the sheet 508 in the form of an unfinished pan at an intermediate point in the method 1000, after the diameter reduction operation 1040 and prior to formation of interlocking curled rims for holding the fold-down wall section in place. FIG. 9A shows a detail view of the wall section 102 nested against the remainder 126 of the pan and between the pull tab 128 and the remainder 126. The vertical portion 111 of the ring 110 is also clearly visible in this view.

Referring back to FIG. 10, the method 1000 may further include forming 1050 a curled rim from the portion 111 of ring all along the wall section and remainder of the pan, while the wall section 102 is nested outside of the remainder 126 as shown in FIG. 9A. Forming the curled rim may thereby include forming overlapping portions of the curled rim from at least one of the wall section 102 or the remainder 128, and engaging the overlapping portions with one another by curling a rim of the wall section 102 inside a rim of the remainder. For example, forming the curled rim further may include removeably engaging the wall section with the remainder of the pan by forming a free sliding relation between the overlapping portions. Any two of more of these operations 1030, 1040 or 1050 may be combined and performed using a single die operation, for example, a forming operation using a progressive die. While the operations are described in a particular order, other orders of operation may also be useful. For example, it may be possible to perform the trimming operation 1030 prior to the cutting operation 1020 or after the diameter reduction operation 1040.

In another aspect, the method 1000 may further include attaching a pull tab 128 to an exterior side of the wall section 102. The pull tab 128 may be attached by crimping to the curled rim. The pull tab 128 may facilitate releasing the cut-out wall section from the remainder of the pan. Pulling the tab outward may cause flexure of the curled rim of the wall section, drawing it out of the curled rim of the remainder of the pan. Once folded down, the wall section is removed from the sidewall 106, providing an opening for removal for a slice of pie, as can be seen in FIG. 1.

Figure 9B:
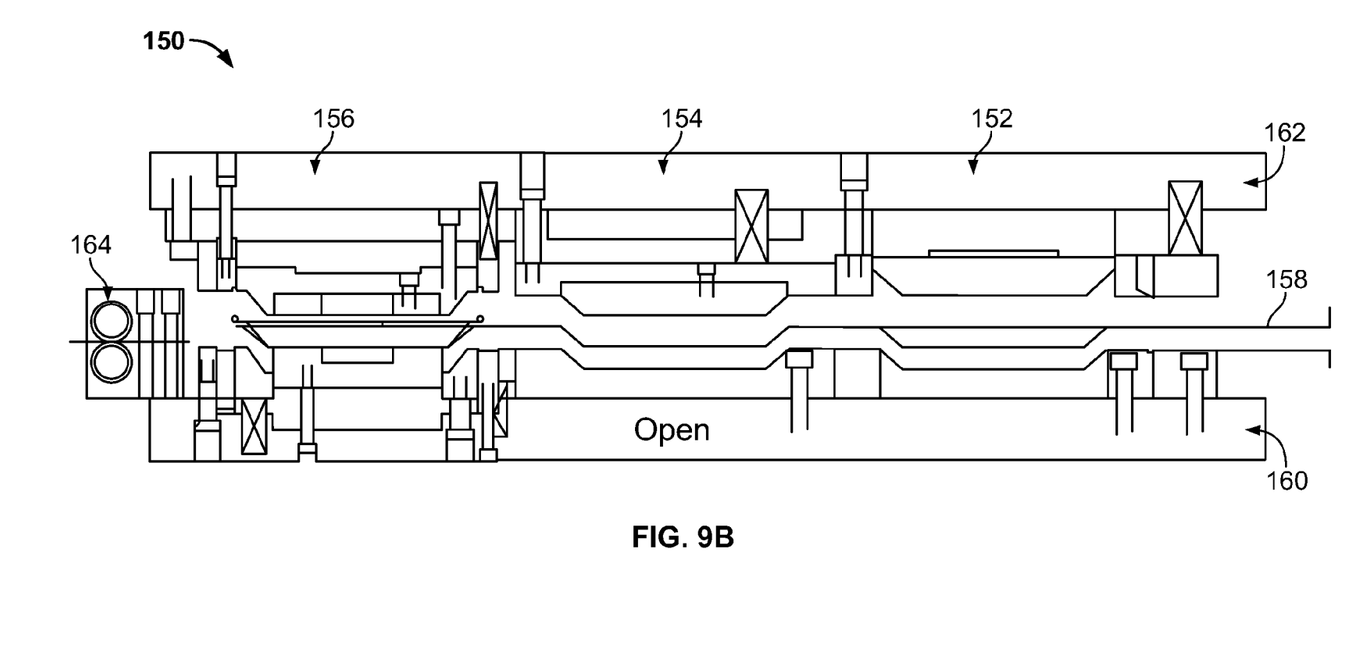
FIG. 9B is a schematic side view of a three-stage die forming and cutting line for forming a foil pie pan with fold-down wall section, shown in an open position.
Figure 9C:
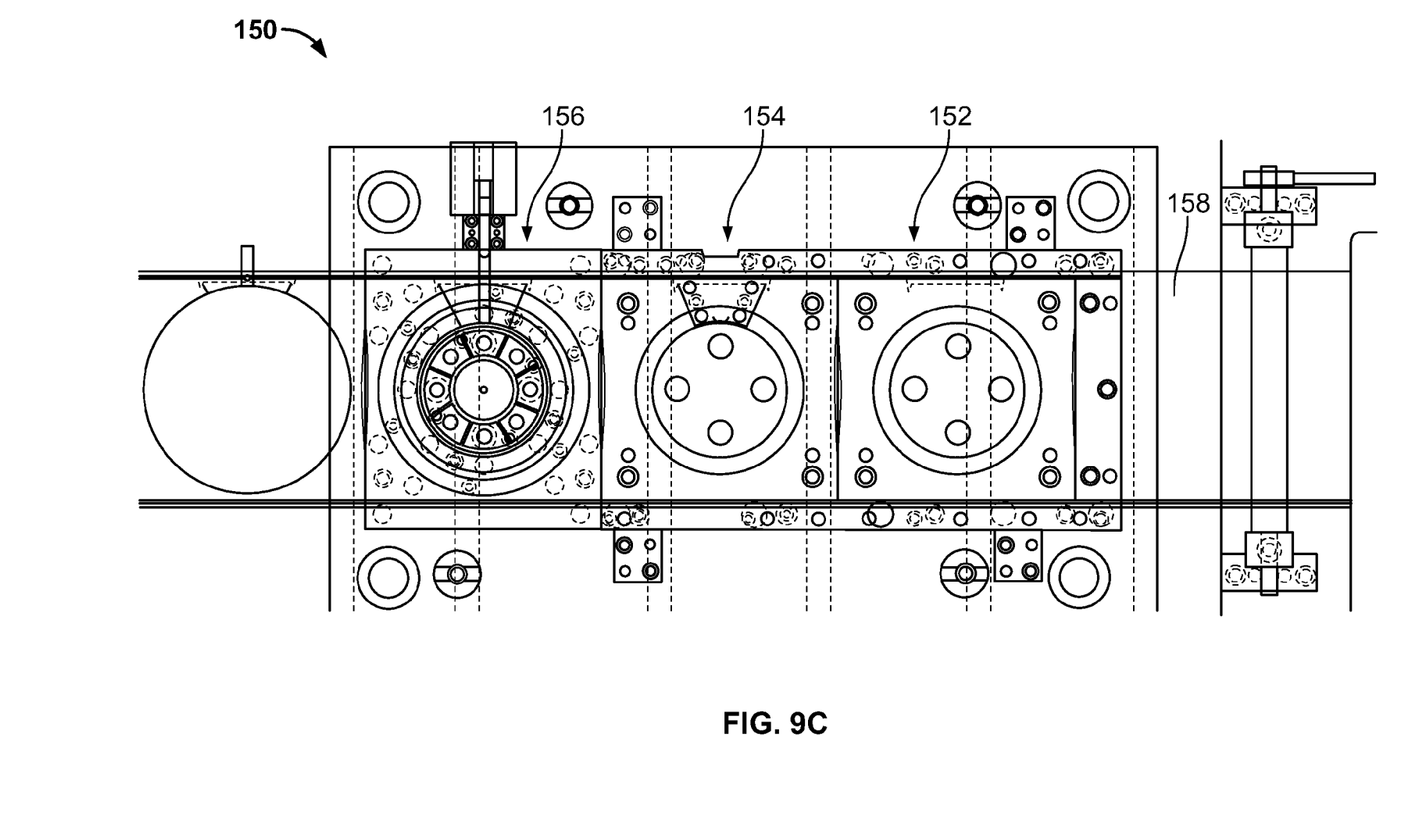
FIG. 9C is a schematic top view of the three-stage die line shown in FIG. 9B.

Referring to FIGS. 9B-9C, the operation of the method 1000 may be performed using a production line of progressive dies and cutters 150 arranged in a sequence of stages, for example, a sequence of three stages. A foil stock 158 may be pulled through the three stages by a driven roller set 164 disposed after the last stage 156, or using some other motive means. The production line 150 may include a moveable upper die retainer 162, which moves up and down against a lower die retainer 160 to form the foil stock 158 into a finished pie pan progressively by operation of each die stage in the sequence. FIG. 9B shows the line 150 in the open position, wherein the upper die retainer 162 is moved to or near its upper limit of vertical travel. The upper die retainer 162 moves down and against the lower die retainer 160 once during each forming operation, and then reopens. When in the open position, the foil stock is moved to the next forming stage, and then the die is closed again for the next forming operation. The opening and closing is repeated, enabling continuous production of pans at three times the cycle period of the progressive die 150. For example, a progressive die operating at a cycle of one second per operation will produce a pie pan every three seconds.

A first stage 152 makes an initial form punch in the foil stock 158, forming a pie pan blank that remains entirely attached to the foil stock and forms the initial, relatively shallow wall angle indicated as 'a' in FIG. 9C. A second stage 154 cuts out the wall section without otherwise changing the shape of the blank. A third and final stage 156 reforms the blank (except for the cut-out wall section) to a deeper angle indicated as 'β' in FIG. 9A. The third stage 156 also cuts the blank from the foil stock around a perimeter of the blank, curls the rim of the cut-out blank thereby attaching the cut-out wall section to the remainder of the pan, while crimping the pull tab to the cut-out wall section to complete the finished pan. The third stage 156 may also emboss any desired pattern, design, or lettering into the bottom of the pan. While a three-stage progressive die is shown, any suitable number of stages may be used.

Figure 11:
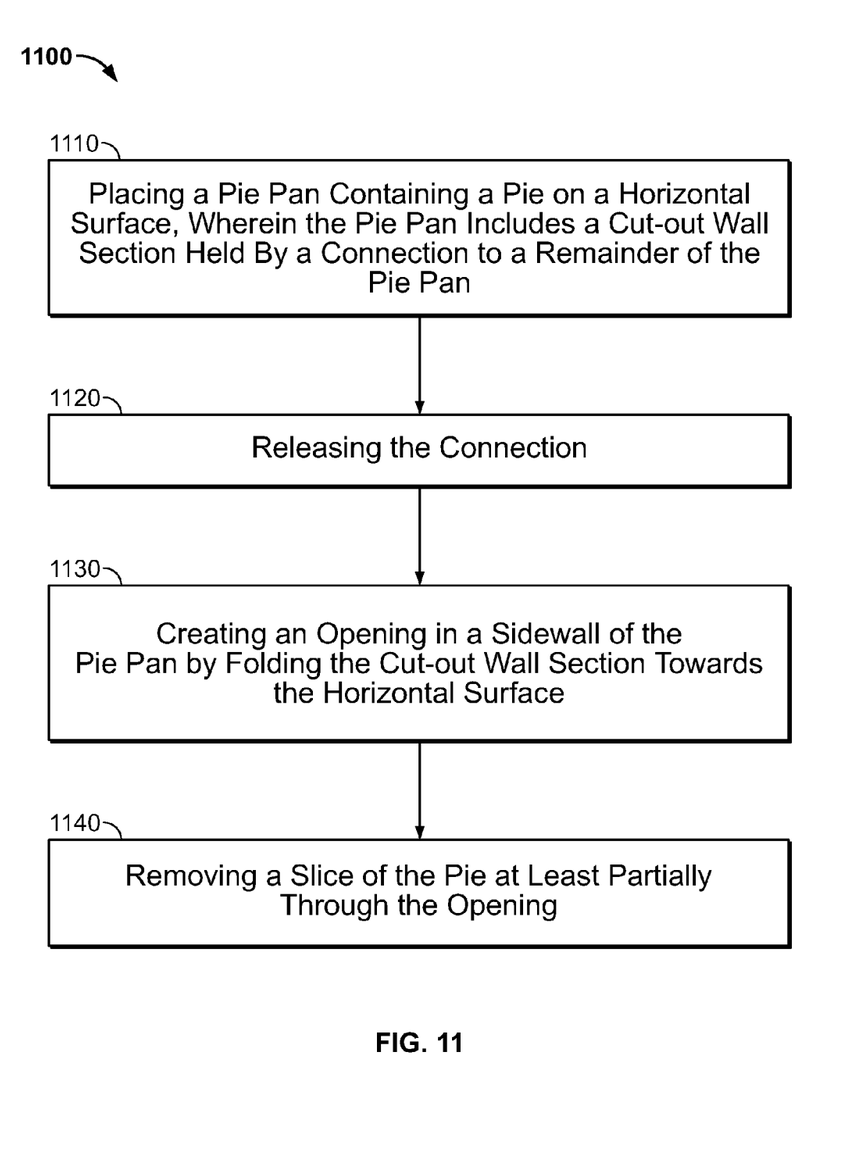
FIG. 11 is a flow chart illustrating operations of a method for using a foil pie pan with fold-down wall section to facilitate removal of a first slice from a pie.

During use of the resulting pan to serve a piece of pie, with reference to FIG. 11, a method 1100 for manipulating a pie pan to facilitate removal of a slice of pie contained therein may include, at 1110, placing a pie pan containing a pie on a horizontal surface, wherein the pie pan includes a cut-out wall section held by a connection to a remainder of the pie pan. The cut-out section may include any foldable or removable wall section as described herein, whether or not made from foil. In an embodiment of the method 1100, only a foil pan as shown in FIG. 1 is used.

The method 1100 may further include, 1120 releasing the connection. In an embodiment, releasing the connection may include disengaging a curled rim of the wall section from engagement inside a curled rim of the remainder of the pie pan, for example, by pulling a pull tab outward. In another embodiment, the foil pan or a separate retainer piece may be torn along a perforation of the connecting piece, releasing the wall section. In another alternative embodiment, an adhesive connection (e.g., an edible wax material) may be broken by application of force, optionally by or after being softened or melted during baking or heating. In a ceramic or other pan of rigid material, the wall section may be released out of the sidewall by lifting up at a predetermined angle, or within a range of predetermined angles, to release interlocking rigid supports designed to interlock when the wall section is resting in the sidewall under the force of gravity, or using a resilient fit. Various other methods of releasing the connection may also be used. Despite different methods of release, a universal aspect of this operation may include releasing a connection that is designed to be temporary and to be weaker than the sidewalls of the pan, and without cutting any part of the pan using a scissors, knife, or other cutting instrument.

The method 1100 may include, at 1130, creating an opening in a sidewall of the pie pan by folding the cut-out wall section towards the horizontal surface, after releasing the connection, and removing a slice of the pie at least partially through the opening. As noted above, other operations for creating an opening without cutting any part of the pan may also be used, for example, lifting out a rigid section of wall. Once the opening is made, the method may include, at 1140, removing a slice of the pie at least partially through the opening in the sidewall of the pan. In addition, a pie knife or the like may be inserted under the pie through the opening, prior to removal of the slice. Thus, the pan and method of use may enable greater ease of removal for the first slice of pie, preserving a presentable appearance of the slice, and preventing waste and frustration.

Accordingly, a pie pan with a fold-down wall section, a method for manufacturing it, and a method for using it or similar pans are disclosed. The previous description of the disclosure is provided to enable any person skilled in the art to make or use the novel subject matter disclosed therein. Various modifications to the disclosure will be readily apparent to those skilled in the art, and the generic principles described herein may be applied to other variations without departing from the spirit or scope of the disclosure. Thus, the disclosure is not intended to be limited to the examples and designs described herein but should be accorded the widest scope consistent with the principles and novel features disclosed herein.

What is claimed is:

1. A pie pan, comprising a sheet of ductile material formed into a sidewall in the form of a truncated cone extending between a closed bottom and an open top, a ring oriented generally parallel to the bottom extending outwardly from and around an upper edge of the sidewall, and a curled rim formed around an outer periphery of the ring, wherein the pie pan is characterized by:
   a pair of cuts through the sidewall, ring, and rim, defining a wall section separated from a remainder of the pie pan and capable of flexure towards the bottom;
   overlapping portions of the curled rim between the wall section and the remainder of the pan, configured for engagement with one another adjacent to the pair of cuts.

2. The pie pan of claim 1, wherein the bottom is circular in shape and the sidewalls are circularly symmetric around a center of the bottom.

3. The pie pan of claim 2, wherein the pair of cuts are aligned along radii overlapping from the center of the bottom.

4. The pie pan of claim 1, further comprising a pull tab attached to an exterior side of the wall section.

5. The pie pan of claim 4, wherein the pull tab is crimped to the curled rim.

6. The pie pan of claim 1, wherein the sheet comprises aluminum foil in the range of 0.003 to 0.020 inches thick.

7. The pie pan of claim 1, wherein the overlapping portions comprise generally concentric cylindrical portions of the curled rim.

8. The pie pan of claim 7, wherein overlapping portions of the curled rim formed from the wall section are reduced in diameter to fit inside corresponding overlapping portions of the curled rim formed from the reminder of the sidewall.

9. The pie pan of claim 1, wherein the wall section is removeably engaged with the remainder of the pan by the overlapping portions.

10. The pie pan of claim 1, further comprising a pie retained therein, wherein the flexure of the wall section exposes a sector of the pie, enabling insertion of a pie removal utensil between the pie and the bottom without touching the sidewall.

11. A method of forming a pie pan from a sheet of ductile material, comprising:
   forming a pan in a sheet of ductile material, the pan comprising a sidewall in the form of a truncated cone extending between a closed bottom and an open top;
   making a pair of cuts through the sidewall and the ring just outside the wider portion, defining a wall section separated from a remainder of the pan;
   trimming the sheet around the sidewall, thereby forming a ring generally parallel to the bottom around an upper perimeter of the sidewall;
   reducing a diameter of the remainder of the pan excluding the wall section; and
   forming a curled rim from the ring all along the wall section and remainder of the pan; wherein forming the curled rim further comprises forming overlapping portions of the curled rim from at least one of the wall section or the remainder of the pan; and wherein forming the curled rim further comprises engaging the overlapping portions with one another by curling a rim of the sidewall inside a rim of the wall section.

12. The method of claim 11, wherein forming the curled rim further comprises removably engaging the wall section with the remainder of the pan by forming a free sliding relation between the overlapping portions.

13. The method of claim 11, further comprising making the pair of cuts aligned along radii extending from a center of the bottom.

14. The method of claim 11, further comprising attaching a pull tab to an exterior side of the wall section.

15. The method of claim 14, wherein the pull tab is attached by crimping to the curled rim.

16. The method of claim 11, wherein forming the sidewall, trimming the sheet, making the pair of cuts, reducing the diameter, and forming the curled rim are performed using a progressive die.

* * * * *